(12) United States Patent
Greinke

(10) Patent No.: US 9,752,743 B1
(45) Date of Patent: Sep. 5, 2017

(54) VOLUMETRIC LIGHT PIPE AND RELATED METHODS

(71) Applicant: DELTA T CORPORATION, Lexington, KY (US)

(72) Inventor: Tom Greinke, Lexington, KY (US)

(73) Assignee: DELTA T CORPORATION, Lexington, KY (US)

( * ) Notice: Subject to any disclaimer, the term of this patent is extended or adjusted under 35 U.S.C. 154(b) by 0 days.

(21) Appl. No.: 14/611,546

(22) Filed: Feb. 2, 2015

Related U.S. Application Data

(60) Provisional application No. 61/934,431, filed on Jan. 31, 2014.

(51) Int. Cl.
  *F21V 8/00* (2006.01)
  *F21S 11/00* (2006.01)
  *F21V 5/04* (2006.01)

(52) U.S. Cl.
  CPC ............. *F21S 11/002* (2013.01); *F21V 5/043* (2013.01); *F21V 5/045* (2013.01); *G02B 6/0096* (2013.01)

(58) Field of Classification Search
  CPC ................................ F21S 11/002; F21V 5/043
  See application file for complete search history.

(56) References Cited

U.S. PATENT DOCUMENTS

| | | | |
|---|---|---|---|
| 5,655,339 A | 8/1997 | DeBlock et al. | |
| 6,256,947 B1 | 7/2001 | Grubb | |
| 6,363,667 B2 | 4/2002 | O'Neill | |
| 6,623,137 B1 | 9/2003 | Marsonette | |
| 6,629,772 B2 * | 10/2003 | Brunfeld | G02B 6/0008 362/257 |
| 6,990,773 B2 | 1/2006 | Borges | |
| 7,177,097 B2 | 2/2007 | Lim et al. | |
| 7,185,464 B2 | 3/2007 | Bracale | |
| 7,546,709 B2 | 6/2009 | Jaster et al. | |
| 7,565,050 B2 | 7/2009 | Lee et al. | |
| 7,757,444 B1 | 7/2010 | Halliday | |
| 7,957,065 B2 | 6/2011 | Jaster | |
| 8,018,653 B2 | 9/2011 | Jaster | |
| 8,098,433 B2 | 1/2012 | Rillie et al. | |
| 8,371,078 B2 | 2/2013 | Jaster | |
| 8,601,757 B2 | 12/2013 | Jaster et al. | |
| 2011/0044041 A1* | 2/2011 | Jaster | F21S 19/005 362/249.02 |
| 2013/0314795 A1 | 11/2013 | Weaver | |
| 2013/0333312 A1 | 12/2013 | Fooks | |
| 2014/0268859 A1* | 9/2014 | Kim | G02B 6/0096 362/553 |

* cited by examiner

*Primary Examiner* — Elmito Breval
(74) *Attorney, Agent, or Firm* — King & Schickli, PLLC

(57) ABSTRACT

A light pipe for distributing light from a light source within a space, comprises a first portion adapted for receiving light from the light source and directing the light along an internal path in a first direction; a second portion adapted for receiving and distributing light received by the first portion from the light source in the first direction into the space; and a third portion intermediate the first and second portions, wherein the third portion is adapted for distributing light to the space in a second direction generally transverse to the first direction. The first portion may comprise a band, a lens, or both. Related aspects and methods are also disclosed.

19 Claims, 2 Drawing Sheets

VOLUMETRIC LIGHT PIPE AND RELATED METHODS

This application claims the benefit of U.S. Provisional Patent Application Ser. No. 61/934,431, the disclosure of which is incorporated herein by reference.

FIELD OF THE INVENTION

This invention relates to the natural lighting arts and, in particular, to a light pipe adapted for providing for the improved distribution of collected light.

BACKGROUND

The desire for the more efficient use of energy has encouraged the development of technologies that harness the natural, free, and often abundant resource of sunlight. Once indoors, obstacles, such as the presence of walls, greatly frustrates the ability to harness the sunlight. Developers have latched on to the concept of using skylight "pipes" or tubes (which are considered synonymous) that can collect light from the sun as it strikes the outside of a building in order to redistribute the light inside, eliminating, or at least reducing, the need for artificial light sources. These light pipes can feature lenses that amplify the light as it is collected, reflectors (including films) for redirecting the light, and diffusers to assist in how the lights is re-distributed inside from an end of the light pipe. However, these pipes have failed to provide a more complete illumination of the space receiving the light, such as by providing a measure of volumetric light (which is also known as "full distribution" lighting or "diffuse" lighting).

Accordingly, a need is identified for forming a light pipe that provides an additional measure of lighting, such as for illuminating spaces transverse to and above the conventional end of a light pipe. The light pipe would be relatively simple in construction and inexpensive to implement in practice. Overall, an improved measure of lighting would be provided for indoor spaces with a concomitant reduction in the use of artificial light and natural resources required to generate it.

SUMMARY

According to one aspect of the disclosure, a light pipe comprises a light transmissive portion forming a portion of the light pipe along its length or intermediate the ends, with the light pipe having a sidewall that is otherwise not light transmissive. This allows light passing along the length of the pipe to be reflected or refracted transversely through the light transmissive portion to illuminate a space external to the light pipe, while light also passes through an end of the light pipe to further illuminate the space.

In one embodiment, the portion comprises a band, and may comprise a lens (such as a Fresnel lens). The band may comprise a transparent acrylic material. A cylindrical lens may also be used as the portion. The portion may be adapted to distribute light along an entire circumference of the light pipe, or any part of the circumference.

A related aspect pertains to a method for volumetric distribution of light from a light pipe. The method comprises comprise introducing a light pipe into a space to receive light through a surface of the space, wherein light partially reflects and/or refracts through a portion of the light pipe to return to the surface of a partition through which the light previously passed.

A further aspect of the disclosure relates to a light pipe for distributing light from a light source within a space. The light pipe comprises a first portion adapted for receiving light from the light source and directing the light along an internal path in a first direction. A second portion adapted for receiving and distributing light received by the first portion from the light source in the first direction into the space. A third portion intermediate the first and second portions is adapted for distributing light to the space in a second direction generally transverse or generally opposite to the first direction.

In one embodiment, the first portion is adapted for connecting to a ceiling associated with the space. The third portion may connect the first portion to the second portion. The third portion may comprise a band, a lens, or both. The first and second portions may each include an interior reflective surface.

A further aspect of the disclosure relates to a light pipe having first and second portions that are at least partially not light transmissive, the light pipe being arranged for receiving light at one end and distributing light from another end thereof to the room from a source external to the room, the improvement comprising a portion between the ends of the light pipe for distributing the light into the room. The portion may comprise a band, a lens, or both. The portion may be adapted to distribute light along an entire circumference of the light pipe.

DESCRIPTION

Figure 1:
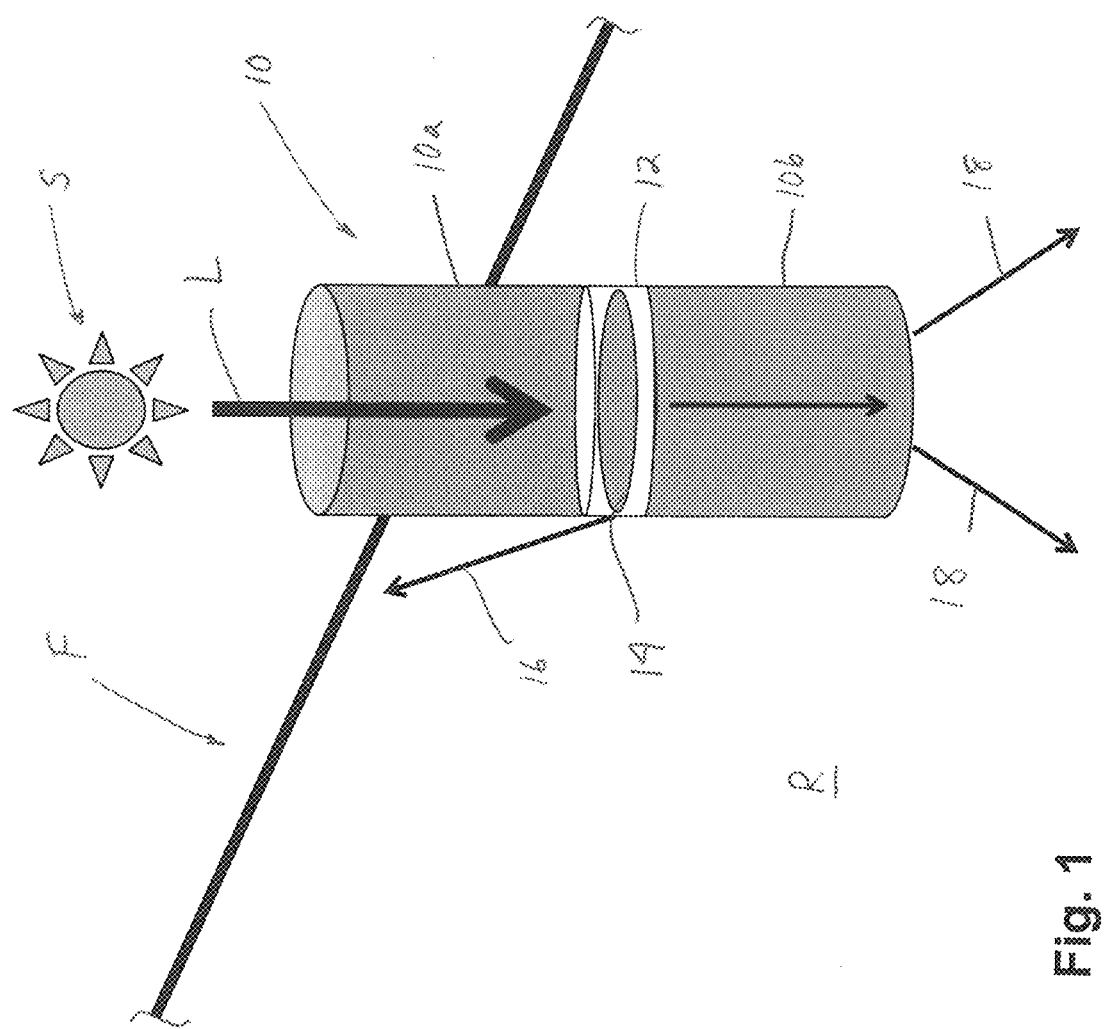
FIG. 1 schematically illustrates one embodiment of a light pipe forming one aspect of the disclosure.

According to one aspect of the disclosure, and with reference to FIG. 1, a light pipe 10 is adapted to receive light L from the exterior of a source of light, such the sun S shining on the roof F of a building. The building may be any type of structure, such as a house, warehouse, or the like having a space in need of internal illumination (either solely as a result of light from the source, or as a natural source to supplement to existing lighting provided to the space by way of conventional lighting fixtures). The light pipe 10 collects the light at one end (typically the upper end) and transmits or conducts it into an interior space, such as a room R, at another end (typically the lower end), and may be constructed in a generally known matter to achieve this result.

In particular, in the illustrated embodiment, the light pipe 10 includes a first portion 10a having a first end that receives light, and a second portion 10b including a second end adapted for placement in the space to receive the light, such as room R. The first portion 10a may be connected to a partition, such as a ceiling C or like structure associated with the building. The positioning may be such as the second portion 10b depends from or projects into the room R (as may part of the first portion 10a as illustrated, but such need not necessarily be the case).

The light pipe 10 may comprise a tubular structure, which may be internally occupied by light reflective or transmissive structures. Specifically, the interior of the pipe 10 may be made suitable for conducting the collected light along its length. To enhance the conduction, some or all of the interior surfaces of the pipe 10 (and in particular portions 10a, 10b) may be made reflective through the use of a coating or material applied thereto. This may be achieved by forming the pipe 10 from a non-light transmissive material, such as Aluminum, which is polished or otherwise adapted to enhance the flow of light through the interior.

The first or upper portion 10a of the light pipe 10 may be adapted for the collection of light. Specifically, a first or upper end of the pipe 10 may be in line with the remainder of the pipe or may be angled with respect to the rest of the pipe. Lenses and/or mirrors may be provided to concentrate the light collected at the first or upper end of the first portion 10a for distribution through the end into the room R. Any mirror or lens may be convex or concave and function to focus the light as it is collected. A reflective surface also be provided adjacent to the end of the first portion 10a in order to enhance the about of light collected. The light pipe 10 may be made of any material or combinations of materials, but should be arranged such that portions 10a, 10b are non-transmissive or opaque to light or otherwise cause light to transmit along the length of the pipe.

Figure 2:
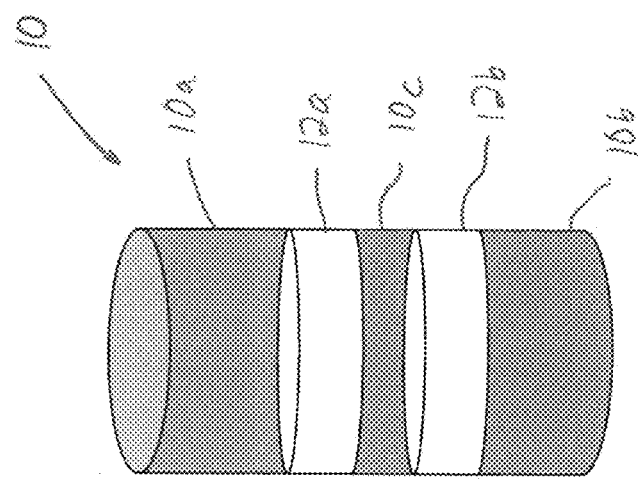
FIG. 2 schematically illustrates another embodiment of the light pipe according to the disclosure.

In accordance with one aspect of the disclosure, the light pipe 10 may further comprise one or more portions for allowing light to pass transversely from the normal path of travel (i.e., the vertical direction in the case of a ceiling mount) to a space external to the pipe, which portion or portions are intermediate of the ends of the pipe. In one embodiment, this light transmissive passage comprises one or more bands 12 extending along the circumference or perimeter of the light pipe 10. The band 12 (or bands 12a, 12b; see FIG. 2 and note third portion 10c of pipe 10, which may also be non-transmissive to light) may comprise a gap between the portions 10a, 10b that represents a change in material and/or opacity, and thus is intermediate the length or between the ends of the pipe 10, and may serve as a connector for connecting these portions together.

The band 12 may provide for an outlet of light refracted or reflected within the pipe 10. Consequently, light is directed from the band 12 into the room R, such as in a generally transverse direction or opposite direction 16 from the direction 18 from which light emanates at the outlet of the pipe 10 at the end of the second portion 10b (which may also include a transparent or translucent portion, such as a diffuser). Thus, when the band 12 is positioned below a ceiling or beyond a wall, the light may return and hit the surface of the ceiling or wall from which it has just passed through in the pipe 10, providing a measure of light for further illuminating the room R.

A lens 14 may also be introduced at or adjacent to the band 12, or such a lens may comprise the light transmissive portion (i.e., a cylindrical lens element). The band 12 may receive light partially reflected or refracted from the lens 14, and diffuse or disperse the received light from the pipe 10. The transparent or translucent band 12 may comprise the exterior surface of the lens 14 positioned across the circumference or perimeter of the pipe 10. The lens 14 and/or the band 12 can partially refract or reflect the light from the pipe 10 at an angle that is less than 90 degrees of the incident angle of the light, such as at 5, 10, 15, 20, 25, 30, 35, 40, 40, 45, 50, 55, 60, 65, 70, 75, 80, or 85 degrees and intermediates thereof in between. The band 12 need not comprise the entire circumference of the pipe 10 and, thus, may comprise any part of it (e.g., between 1-360 degrees of the circumference when the pipe 10 is circular in cross-section).

Rather than a band 12, the gap or change in material created by the transparent or translucent portion may also be an alteration in opacity of the pipe 10. For example, an introduced transparent or translucent material may be positioned between portions 10a, 10b that allows for the passage or partial passage of light from the pipe 10 at a point that is intermediate the length of the pipe. Alternatively, the pipe 10 may be formed of a transparent or translucent material having a reflective coating, and the portion for providing volumetric light may comprise a break in the reflective material or properties that line the interior of the pipe.

Those skilled in the art will appreciate that the band 12 and/or the lens 14 should be placed along the light pipe 10 at such a position that it will be introduced into the room R to receive the light therefrom. For example, the band 12 may be positioned near a ceiling or wall through which the light pipe is introduced into the room R. Thereby, the light may partially be directed from the interior of the pipe 10 through the band 12/lens 14 and on to the wall/ceiling through which the light has just passed, as well as on through the end of the light pipe 10. Those skilled in the art will appreciate that partial reflection/refraction of the light back on to a surface through which the light has just passed provides a volumetric distribution of the collected light.

As noted above, the light pipe 10 also comprises a second end (such as the distal part of portion 10b) that can be located in the inner room R that is to receive the light collected from the pipe and allow it to enter the room. Hence, the second end is at least transparent or translucent, even though the sidewalls of the corresponding portion 10b may be opaque and reflective. The second end may also be covered with a diffuser to even the spread of light around the room. The second end may also be closed or covered with a transparent or translucent material to assist in further insulating the light pipe.

The lens 14 may be any type of lens, such as a concave, convex or other combination thereof. The lens 14 may, for example, comprise a Fresnel lens. The lens 14 may be coated or partially coated in a reflective material or be comprised of a reflective or partially reflective material. The lens 14 may be designed to partially reflect or refract some light that is otherwise passing through the lens toward the opposing end of the pipe. The lens 14 may extend through or across the pipe 10 or be otherwise in communication with a transparent or translucent material, such that refracted or reflected light from the lens may exit the pipe. The lens 14 may traverse the pipe 10 at a perpendicular angle or a variant thereof, such as at 5, 10, 15, 20, 25, 30, 35, 40, 40, 45, 50, 55, 60, 65, 70, 75, 80, or 85 degrees and intermediates thereof in between. The lens 14 may be comprised or a transparent or translucent material, such as a polymer like acrylic or nylon, or of a natural mineral, such as quartz or a silica. The lens 14 may be plastic or glass.

The other salient features of the light pipe are understood in the art. See, e.g., U.S. Pat. No. 8,479,461, D585,365, RE38,217, U.S. Pat. Nos. 5,983,581, 5,913,785, RE36,496, U.S. Pat. Nos. 8,568,011, 8,083,363, 7,954,281, 7,146768, 6,990,773, 6,604,329, 6,918,216, all of which are herein incorporated by reference in their entirety. U.S. Pat. No. 7,146,768 and RE36,496 set forth the main properties of a light pipe, such as a tube for conducting collected light, as well as optional lenses and diffusers at the openings to improve the operation of collecting and dispersing the light.

The light pipe 10 may be enclosed to prevent outdoor conditions, such as rain and colder temperatures, from affecting the inner room R. The light pipe 10 may further be encased in an insulating material. The upper end of the pipe 10 that would otherwise be open may be closed or covered with a transparent or translucent cover to protect the light pipe and the inner room R from the elements the light pipe may be exposed to on the exterior of a building.

Also disclosed are methods of improving the distribution of light collected in a light pipe 10. The methods comprise partially reflecting and/or refracting the light at a position intermediate the length of the light pipe, such that the light can both pass through the end of the pipe and partially pass through the surface of a wall/ceiling of the room receiving the light tube and reflect/refract back onto the surface through which it passed. Those skilled in the art will appreciate that the presence of the transmissive portion (i.e., band and/or lens) in the pipe 10 allows for the partial reflection and/or refraction of the light from the interior of the pipe on to a surface through which it just passed.

Having shown and described various embodiments, further adaptations of the apparatuses, methods and systems described herein may be accomplished by appropriate modifications by one of ordinary skill in the art without departing from the scope of the disclosure. Several of such potential modifications have been mentioned, and others will be apparent to those skilled in the art. For instance, the examples, embodiments, geometries, materials, dimensions, ratios, steps, and the like discussed above are illustrative and are not required. Accordingly, the scope of the disclosure should be considered in terms of claims that may be presented, and is understood not to be limited to the details of structure and operation shown and described in the specification and drawings.

I claim:

1. A light pipe adapted for transmitting light from an exterior to an interior of a space with a partition, said light pipe comprising:
    a first pipe portion that is not light transmissive, said first pipe portion configured to connect to the partition and to receive light from a source exterior to the space;
    a second pipe portion that is not light transmissive and configured for placement within the space; and
    a light transmissive portion including a lens forming a portion of the light pipe intermediate the first pipe portion and the second pipe portion;
    wherein the light transmissive portion allows light entering the pipe to be reflected or refracted transversely through the light transmissive portion to illuminate the space external to the light pipe, while light may also pass through the second pipe portion to further illuminate the space.

2. The light pipe of claim 1, wherein the portion comprises a band.

3. The light pipe of claim 2, wherein the band comprises a transparent acrylic material.

4. The light pipe of claim 1, wherein the lens is a Fresnel lens.

5. The light pipe of claim 1, wherein the portion comprises a generally cylindrical lens.

6. The light pipe of claim 1, wherein the portion is adapted to distribute light along an entire circumference of the light pipe.

7. The light pipe of claim 1, wherein the first pipe portion is adapted for placement at least partially external to the space and at least partially internal to the space.

8. The light pipe of claim 1, further including a translucent cover on the first pipe portion to protect the light pipe and the space from external elements entering the space.

9. A method for the volumetric distribution of light from a light pipe for receiving light at one end thereof and conducting the light from to another end thereof, comprising:
    providing the light pipe at least partially within a space to receive light through an aperture in a surface of the space, wherein light is transmitted through a portion of the light pipe intermediate the ends to return to the surface.

10. A light pipe for distributing light from a light source within a space, comprising:
    a first portion adapted for receiving light from the light source and directing the light along an internal path in a first direction;
    a second portion adapted for receiving and distributing light received by the first portion from the light source in the first direction into the space; and
    a third portion comprising a lens intermediate the first and second portions, wherein the third portion is adapted for distributing light to the space in a second direction generally opposite or generally transverse to the first direction;
    wherein the first portion is adapted for connecting to a ceiling associated with the space.

11. The light pipe of claim 10, wherein the third portion connects the first portion to the second portion.

12. The light pipe of claim 10, wherein the third portion comprises a band.

13. The light pipe of claim 10, wherein the first and second portions each include an interior reflective surface.

14. In a light pipe mounted to a ceiling for transmitting light passing therethrough into a room, the light pipe having first and second portions that are not light transmissive, the light pipe being arranged for receiving light at one end and distributing light from another end thereof to the room from a source external to the room, the improvement comprising a portion between the ends of the light pipe for distributing the light into the room.

15. The light pipe of claim 14, wherein the portion comprises a band.

16. The light pipe of claim 15, wherein the band comprises a lens.

17. The light pipe of claim 14, wherein the band comprises a transparent acrylic material.

18. The light pipe of claim 14, wherein the portion comprises a generally cylindrical lens.

19. The light pipe of claim 14, wherein the portion is adapted to distribute light along an entire circumference of the light pipe.

* * * * *